(12) United States Patent
Jons et al.

(10) Patent No.: US 10,717,050 B2
(45) Date of Patent: *Jul. 21, 2020

(54) SPIRAL WOUND MEMBRANE MODULE ADAPTED FOR HIGH RECOVERY

(71) Applicant: DDP SPECIALTY ELECTRONIC MATERIALS US, INC., Collegeville, PA (US)

(72) Inventors: Steven D. Jons, Eden Prairie, MN (US); Michael S. Koreltz, Bloomington, MN (US); Luke Franklin, Minneapolis, MN (US)

(73) Assignee: DDP SPECIALTY ELECTRONIC MATERIALS US, INC., PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,767

(22) Filed: Mar. 19, 2019

(65) Prior Publication Data

US 2019/0217251 A1    Jul. 18, 2019

Related U.S. Application Data

(63) Continuation of application No. 15/120,271, filed as application No. PCT/US2015/021137 on Mar. 18, 2015, now Pat. No. 10,258,928.

(Continued)

(51) Int. Cl.
| | |
|---|---|
| *B01D 65/08* | (2006.01) |
| *B01D 61/08* | (2006.01) |
| *B01D 63/10* | (2006.01) |

(52) U.S. Cl.
CPC ............ *B01D 65/08* (2013.01); *B01D 61/08* (2013.01); *B01D 63/103* (2013.01);
(Continued)

(58) Field of Classification Search
CPC ...... B01D 65/08; B01D 63/103; B01D 61/08; B01D 2321/2008; B01D 2313/04; B01D 2313/143; B01D 2313/086
(Continued)

(56) References Cited

U.S. PATENT DOCUMENTS

| | | | |
|---|---|---|---|
| 4,235,723 | A | 11/1980 | Barlett, Jr. |
| 5,034,126 | A | 7/1991 | Reddy et al. |

(Continued)

FOREIGN PATENT DOCUMENTS

| | | |
|---|---|---|
| CN | 101711948 | 5/2010 |
| CN | 102166477 | 8/2011 |

(Continued)

*Primary Examiner* — Nam X Nguyen
*Assistant Examiner* — Julia L. Wun
(74) *Attorney, Agent, or Firm* — Edward W. Black; Kenneth Crimaldi

(57) ABSTRACT

A spiral wound membrane module adapted for hyperfiltration and including at least one membrane envelope and feed spacer sheet wound about a central permeate tube to form an inlet and outlet scroll face and an outer periphery,
  wherein the feed spacer sheet includes:
  i) a feed entrance section extending along the permeate collection tube from the inlet scroll face toward the outlet scroll face,
  ii) a feed exit section extending along the outer periphery from the outlet scroll face toward the inlet scroll face, and
  iii) a central feed section located between the feed entrance section and the feed exit section; and
  wherein the feed entrance section has a median resistance to flow in a direction parallel to the permeate collection tube that is less than 25% of the median resistance to flow of the central feed section in a direction perpendicular to the permeate collection tube.

9 Claims, 2 Drawing Sheets

Related U.S. Application Data

(60) Provisional application No. 61/972,546, filed on Mar. 31, 2014.

(52) U.S. Cl.
CPC .... *B01D 2313/04* (2013.01); *B01D 2313/086* (2013.01); *B01D 2313/143* (2013.01); *B01D 2321/2008* (2013.01)

(58) Field of Classification Search
USPC ... 210/321.83, 321.72, 321.74, 494.1, 494.3, 210/644, 649, 650, 652, 433.1, 435, 437, 210/497.01, 497.1, 457, 541
See application file for complete search history.

(56) References Cited

U.S. PATENT DOCUMENTS

| | | | |
|---|---|---|---|
| 5,096,584 A | 3/1992 | Reddy et al. | |
| 5,275,726 A * | 1/1994 | Feimer | B01D 63/10 210/321.74 |
| 5,458,774 A | 10/1995 | Mannapperuma | |
| 5,711,882 A | 1/1998 | Hofmann et al. | |
| 6,454,942 B1 | 9/2002 | Shintani et al. | |
| 6,881,336 B2 * | 4/2005 | Johnson | B01D 63/10 210/321.74 |
| 7,306,709 B2 | 12/2007 | Grebenyuk et al. | |
| 8,337,698 B2 | 12/2012 | Hou | |
| 2003/0205520 A1 | 11/2003 | Johnson | |
| 2004/0182774 A1 | 9/2004 | Hirokawa et al. | |
| 2005/0284806 A1 | 12/2005 | Husain et al. | |
| 2011/0036774 A1 | 2/2011 | McGinnis | |
| 2013/0146532 A1 | 6/2013 | Dontula et al. | |
| 2014/0042080 A1 | 2/2014 | Hou et al. | |
| 2014/0183134 A1 | 7/2014 | Herron | |

FOREIGN PATENT DOCUMENTS

| | | |
|---|---|---|
| CN | 202934798 | 5/2012 |
| CN | 202844891 | 4/2013 |
| JP | 59150505 | 8/1984 |
| JP | 63151304 | 6/1988 |
| WO | 1993010889 | 6/1993 |
| WO | 2013085755 | 6/2013 |

* cited by examiner

SPIRAL WOUND MEMBRANE MODULE ADAPTED FOR HIGH RECOVERY

FIELD

The invention generally relates spiral wound membrane module used in water filtration.

Introduction

Spiral wound membrane modules are used in a variety of reverse osmosis and nanofiltration applications; see for example: U.S. Pat. Nos. 5,458,774, 6,881,336, 8,337,698 and US 20040182774. Spiral wound modules operate in "cross-flow" mode with feed water passing across a membrane surface with a portion passing through the membrane as "permeate." The percentage of feed solution passing through the membrane is referred to as the "recovery" or "recovery rate." Depending upon the composition of the feed, operating at high recoveries can lead to scaling as salts and other dissolved solids in the feed become concentrated above their solubility limit. Spiral wound modules used in residential RO systems are typically designed for recoveries between 20-35%. Operating at higher recoveries (e.g. above 35%) often leads to scaling as un-softened residential water sources can contain significant quantities of calcium and bicarbonate ions.

SUMMARY

The present invention is a spiral wound module designed to mitigate scaling. In a preferred embodiment, the module (2) includes at least one membrane envelope (4) and feed spacer sheet (6) wound about a central permeate tube (8) to form an inlet (30) and outlet (32) scroll face and an outer periphery (38). The feed spacer sheet (6) includes:
  i) a feed entrance section (50) extending along the permeate collection tube (8) from the inlet scroll face (30) toward the outlet scroll face (32),
  ii) a feed exit section (52) extending along the outer periphery (38) from the outlet scroll face (32) toward the inlet scroll face (30), and
  iii) a central feed section (54) located between the feed entrance section (50) and the feed exit section (52).
The feed entrance section (50) of the feed spacer sheet (6) has a median resistance to flow in a direction parallel to the permeate collection tube (8) that is less than 25% of the median resistance to flow of the central feed section (54) in a direction perpendicular to the permeate collection tube (8).

DETAILED DESCRIPTION

Reverse osmosis (RO) and nanofiltration (NF) are membrane-based separation processes where pressure is applied to a feed solution on one side of a semi-permeable membrane. The applied pressure causes "solvent" (e.g. water) to pass through the membrane (i.e. forming a "permeate") while "solutes" (e.g. salts) are unable to pass through the membrane and are concentrated in the remaining feed (i.e. forming a "concentrate" solution). Once concentrated beyond their solubility limit, retained salts (e.g. $CaCO_3$) begin to form scale on the membrane. Such scale is especially problematic for long term operation of residential RO systems at high recovery.

The present invention includes a spiral wound module suitable for use in reverse osmosis (RO) and nanofiltration (NF) systems operating at high recoveries. Such modules include one or more RO or NF membrane envelopes and feed spacer sheets wound about a permeate collection tube. RO membranes used to form envelops are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions—depending upon the species of divalent ion. NF membranes also typically reject particles in the nanometer range as well as organic molecules having molecular weights greater than approximately 200 to 500 Daltons. For purposes of this description, the term "hyperfiltration" encompasses both RO and NF.

Figure 1:
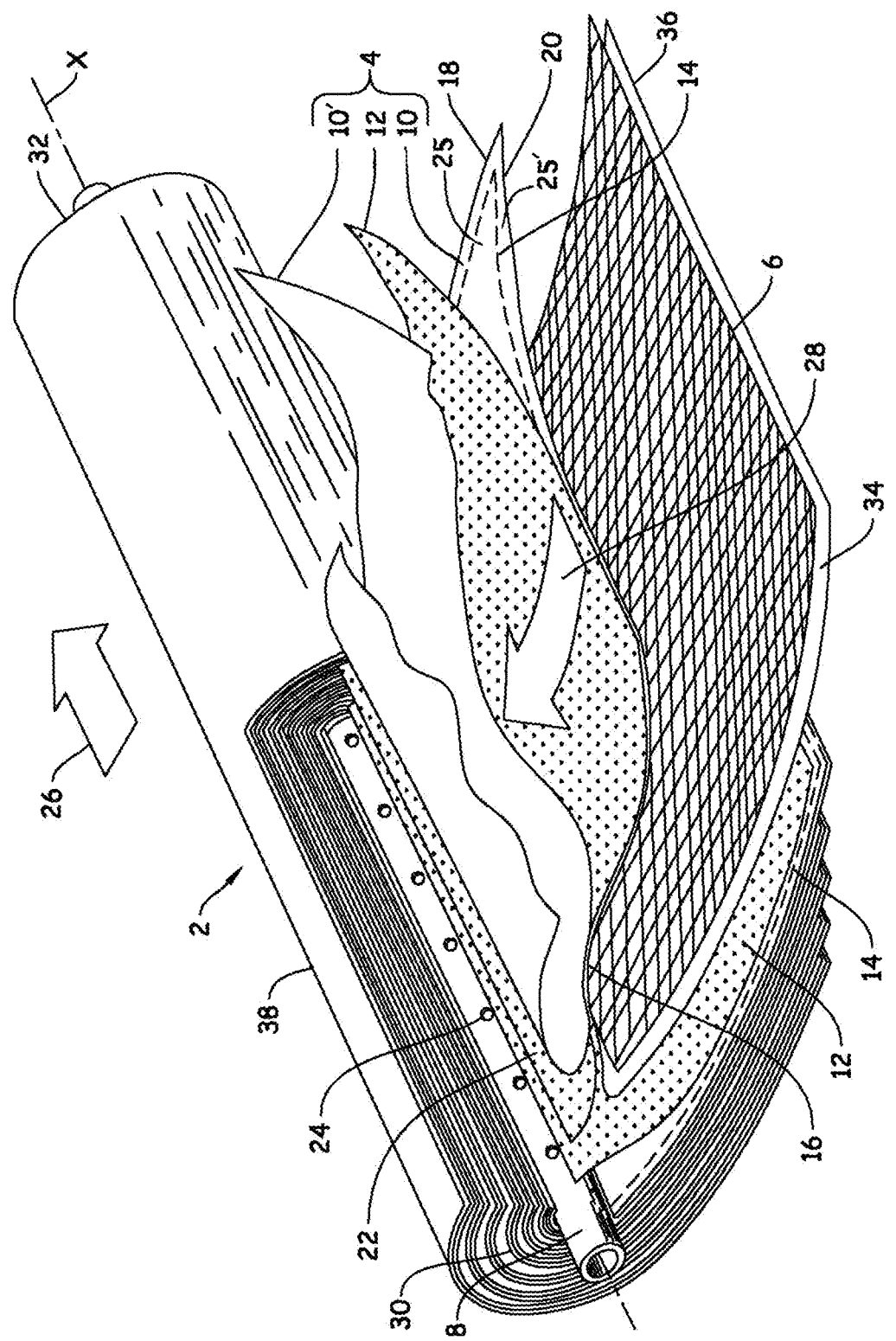
FIG. 1 is a perspective, partially cut-away view of a spiral wound membrane module.

A representative spiral wound membrane module is generally shown at 2 in FIG. 1. The module (2) is formed by concentrically winding one or more membrane envelopes (4) and feed spacer sheet(s) ("feed spacers") (6) about a permeate collection tube (8). Each membrane envelope (4) preferably comprises two substantially rectangular sections of membrane sheet (10, 10'). Each section of membrane sheet (10, 10') has a membrane or front side (34) and support or back side (36). The membrane envelope (4) is formed by overlaying membrane sheets (10, 10') and aligning their edges. In a preferred embodiment, the sections (10, 10') of membrane sheet surround a permeate spacer sheet (12). This sandwich-type structure is secured together, e.g. by sealant (14), along three edges (16, 18, 20) to form an envelope (4) while a fourth edge, i.e. "proximal edge" (22) abuts the permeate collection tube (8) so that the inside portion of the envelope (4) (and optional permeate spacer (12)) is in fluid communication with a plurality of openings (24) extending along the length of the permeate collection tube (8). The active membrane region (25) for each section of membrane sheet (10, 10') corresponds to the area of membrane through which liquid may pass into the envelope (4) during operation; (in contrast to non-active membrane regions (25') that are isolated by adhesives, tapes, etc. so that the flow of liquid through the membrane and into the inside of the permeate envelope is prevented). The module (2) may include a single envelope or a plurality of membrane envelopes (4) each separated by a feed spacer sheet (6). In the illustrated embodiment, membrane envelopes (4) are formed by joining the back side (36) surfaces of adjacently positioned membrane leaf packets. A membrane leaf packet comprises a substantially rectangular membrane sheet (10) folded upon itself to define two membrane "leaves" wherein the front sides (34) of each leaf are facing each other and the fold is axially aligned with the proximal edge (22) of the membrane envelope (4), i.e. parallel with the permeate collection tube (8). A feed spacer sheet (6) is shown located between facing front sides (34) of the folded membrane sheet (10). The feed spacer sheet (6) facilitates flow of feed fluid through the module (2). While not shown, additional intermediate layers may also be included in the assembly. Representative examples of membrane leaf packets and their to fabrication are further described in U.S. Pat. No. 7,875,177 to Haynes et al.

During module fabrication, permeate spacer sheets (12) may be attached about the circumference of the permeate collection tube (8) with membrane leaf packets interleaved therebetween. The back sides (36) of adjacently positioned membrane leaves (10, 10') are sealed about portions of their periphery (16, 18, 20) to enclose the permeate spacer sheet (12) and to form a membrane envelope (4). Suitable techniques for attaching the permeate spacer sheet to the permeate collection tube are described in U.S. Pat. No. 5,538,642 to Solie. The membrane envelope(s) (4) and feed spacer(s) (6) are wound or "rolled" concentrically about the permeate collection tube (8) to form two opposing scroll faces (inlet scroll face (30) and outlet scroll face (32)) and an outer periphery (38). The resulting spiral bundle is held in place by tape or other means. The scroll faces (30,32) of the module may then be trimmed and a sealant may optionally be applied at the junction between the scroll face (30, 32) and permeate collection tube (8) as described in U.S. Pat. No. 7,951,295 to Larson et al. An impermeable layer such as tape may be wound about the circumference of the wound module as described in U.S. Pat. No. 8,142,588 to McCollam. In alternative embodiments, a porous tape or fiberglass coating may be applied to the module's periphery.

Arrows shown in FIG. 1 illustrate general flow directions (26, 28) of feed and permeate through the module (2). More specifically, feed fluid enters the module (2) from the inlet scroll face (30) and exits the module from the outlet scroll face (32). Permeate fluid flows along the permeate spacer sheet (12) in a direction generally perpendicular to the permeate collection tube (8) as indicated by arrow (28).

To better illustrate the feed flow pathway shown by dotted arrows (48), module (2) is shown in an unwound state including a membrane envelope (4) and feed spacer sheet (6) extending from permeate collection tube (8). The feed spacer sheet (6) preferably comprises a sheet of polymeric web or net material including a plurality of crossing filaments, similar to those available under the trade name VEXAR™ from Conwed Plastics or as described in U.S. Pat. No. 6,881,336 to Johnson. More specifically, the feed spacer sheet (6) includes:

i) a feed entrance section (50) extending along the permeate collection tube (8) from the inlet scroll face (30) toward the outlet scroll face (32), ii) a feed exit section (52) extending along the outer periphery (38) (i.e. adjacent the distal edge of membrane envelope (20)) from the outlet scroll face (32) toward the inlet scroll face (30), and iii) a central feed section (54) located between the feed entrance section (50) and the feed exit section (52).

In a preferred embodiment, the feed entrance section (50) and central feed section (54) of the feed spacer sheet (6) each have a distinct median resistance to flow; wherein the term "resistance to flow" refers to the pressure drop per unit of distance at a water velocity of 15 cm/second at 25° C. More specifically, the feed entrance section (50) has a median resistance to fluid in a direction parallel to the permeate collection tube (8) that is less than 25% of the median resistance to flow of the central feed section (54) in a direction perpendicular to the permeate collection tube (8). In another preferred embodiment, the feed exit section (52) of the feed spacer sheet (6) also has a median resistance to flow that is less than 25% of the median resistance to flow of the central feed section (54) in a direction perpendicular to the permeate collection tube (8). In this way, the feed entrance (50) and exit (52) sections effectively serve as low resistance flow distributors for feed fluid to flow to and from the central feed section (54). Preferably, the median resistance to flow perpendicular to the permeate collection tube (8) in the central feed section (54) is greater than 0.5 psi/ft, more preferably greater than 1 psi/ft, or even greater than 2 psi/ft, when measured at 25° C. with an average flow velocity of 15 cm/sec. The median resistance to flow parallel to the permeate collection tube (8) in the feed entrance section (50) and/or feed exit section (52) is preferably less than 1.0 psi/ft, more preferably less than 0.5 psi/ft, or even less than 025 psi/ft, when measured at 25° C. with a flow velocity of 15 cm/sec.

The feed spacer sheet (6) may be in the form of a single sheet with distinct sections (feed entrance (50), feed exit (52) and central feed (54)) having different resistances to flow, or may comprise separate sections that may be optionally secured together to facilitate module assembly. For example, the feed spacer sheet (6) may be produced with sections having different thicknesses, free volume, number of filaments, angles between filament, and strand thinning Orientation of the feed spacer relative to the direction of flow (48) can also be used to vary flow resistance in a specified direction. For example, the same spacer material may be used within the central feed section (54) as in the feed entrance section (50) and feed exit sections (52) but can be made "distinct" by orientating individual filaments (e.g. at 90°) in a manner to change its resistance to flow in a direction parallel to permeate collection tube (8), (i.e. axis X). Preferably, the central feed section (54) contains a net oriented to provide lower flow resistance in the direction perpendicular to the permeate tube (8). Preferably, the feed entrance section (50) and/or feed exit section (52) contains a net oriented to provide lower flow resistance in the direction parallel to the permeate collection tube (8).

Figure 2:
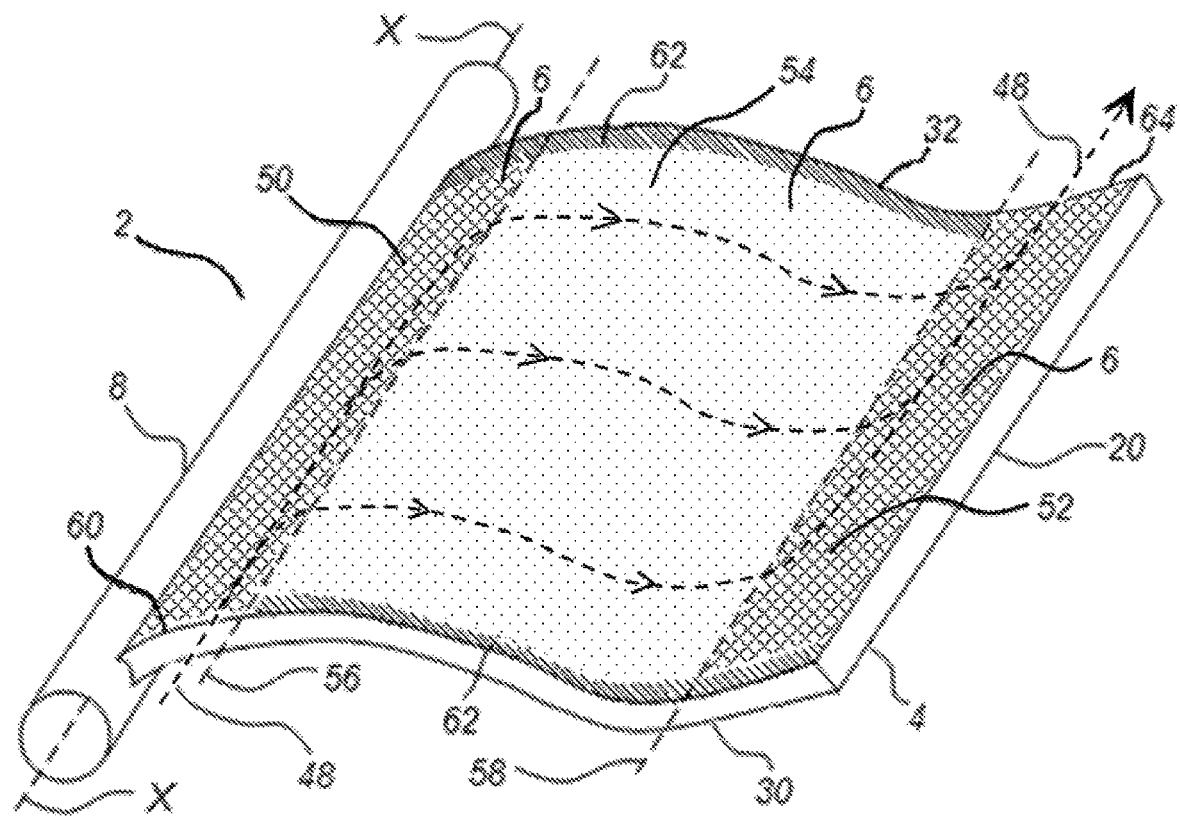
FIG. 2 is a perspective view of a partially assembled spiral wound membrane module.

In another embodiment, resistance to feed flow parallel to the permeate collection tube (8) may be reduced by modifying a component of the feed spacer sheet (6) in one or more sections throughout the feed spacer sheet (6). For instance, regions of a net in the feed entrance section (50) and/or feed exit section (52) may be cut out. Preferably, removed sections are elongated and oriented in the direction of the permeate collection tube (8). Alternatively, flow channels may be embossed into a net to make flow easier in the direction of the permeate tube (8). In yet another alternative embodiment, the entire of spacer sheet (6) may include a first spacer sheet type, and a lower resistance layer may be added to overlap the first spacer sheet type in one or both the feed entrance and feed exit sections (50, 52) of the feed spacer sheet (6), thus lowering the resistance to flow within a given section. More generally, the module (2) may include a first spacer sheet type located within the central feed section (54) and either the feed entrance section (50) or the feed exit section (52) of the feed spacer sheet (6) may include both a first spacer sheet type and an overlapping second spacer type with the second spacer sheet type preferably having less median resistance to flow in a direction parallel to the permeate collection tube (8) than the first spacer sheet type. More preferably, the second spacer sheet type is a net oriented to have less resistance to flow in the direction parallel to the permeate collection tube (8) than in the direction perpendicular to the permeate collection tube (8). The second spacer type may be affixed to the first spacer sheet type to aid in module rolling. The feed entrance section (50) and feed exit section (52) of the feed spacer sheet (6)

are shown in FIG. 2 as being separated from the central feed section (54) by dotted lines (56, 58). While not shown to scale in FIG. 2, the feed entrance section (50) and feed exit section (52) each preferably comprise less than 20% (and more preferably less than 15% or event 10%) of the total area of the feed spacer sheet (6) with the central feed section (54) comprising the majority (e.g. 60%, 75%, 90%, etc.) of the total area. In the preferred embodiment shown, the feed entrance and exit sections (50, 52) are generally rectangular shaped and are located along the permeate collection tube (8) and outer periphery (38), respectively. In a yet another preferred embodiment, a majority (over 50% of area) of the feed exit section (52) of the feed spacer sheet (6) is in planar contact with the non-active membrane region (25') of the membrane sheet (10), preferably at a location between the active membrane region (25) and module's outer periphery (38). In a still further preferred embodiment, the feed exit section (52) only contacts non-active membrane regions (25') of a membrane sheet (10) at points distal to its active membrane region (25).

In the preferred embodiment shown, the feed entrance and exit sections (50, 52) are generally rectangular shaped and are located along the permeate collection tube (8) and outer periphery (38), respectively. In a yet another preferred embodiment, a majority (over 50% of area) of the feed exit section (52) of the feed spacer sheet (6) is in planar contact with the non-active membrane region (25') of the membrane sheet (10), preferably at a location between the active membrane region (25) and module's outer periphery (38). In a still further preferred embodiment, the feed exit section (52) only contacts non-active membrane regions (25') of a membrane sheet (10) at points distal to its active membrane region (25).

In a preferred embodiment, feed flow into the module is restricted to areas concentrically located about the permeate collection tube (8) and spaced from the outer periphery (38). Similarly, feed flow out of the module (2) is preferably restricted to areas adjacent to the outer periphery (38) of the outlet scroll face (32). The means for restricting flow into and out of the module are not particularly limited and include the use of sealants (62) or tape (not shown) on the scroll faces (30, 32). In an alternative embodiment shown in FIG. 3 optional cap members (33, 35) may be attached to respective inlet and exit scroll faces (30, 32) of the module (2). Positioning means (37) on a cap member may align the cap member to the permeate tube (8) or outer periphery (38). An inlet cap member (33) may restrict flow into the inlet scroll face (30) to a feed entrance region (60) near the permeate tube (8). An exit cap member (35) may restrict flow through the exit scroll face (32) to a region near the outer periphery (38). Preferably, at least 50% and more preferably at least 75% of feed liquid passing through the central feed section (54) also passes through a feed exit region (64).

Figure 3:
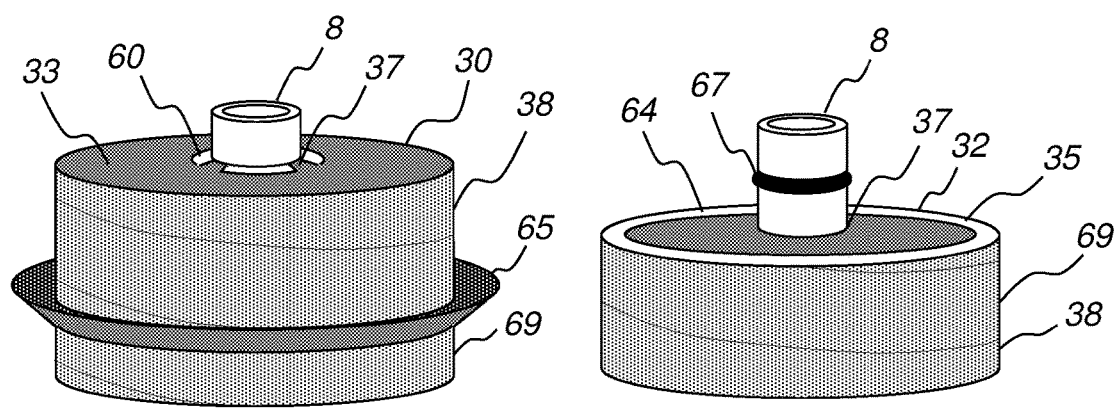
FIG. 3 is a perspective, partially cut-away view of an embodiment individually showing the opposing scroll faces of a spiral wound membrane module.

The embodiment shown in FIG. 3 also illustrates several other optional features. An impermeable layer (69), e.g. tape, is shown wrapped about the peripheral surface (38). A brine seal (65) is located to this impermeable layer (69) and oriented to provide best sealing when high pressure is applied to the feed inlet region (60). On the opposite end of the module, corresponding to the feed exit region (64), an o-ring is shown as a sealing member (67) attached to the permeate collection tube (8), i.e. near the outlet scroll face (32). While not shown, the permeate collection tube (8) may further to include a sealed end near the inlet scroll face (30).

In operation, feed flows into the feed entrance region (60) located on the inlet scroll face (30) adjacent to the permeate collection tube (8), flows axially along the permeate collection tube (8) within the feed entrance section (50) and then flows radially through the central feed section (54) toward the outer periphery (38) to the feed exit section (52) where feed subsequently flows axially to exit the module (2) at a feed exit region (64) located on the outlet scroll face (32) adjacent to the outer periphery (38). Thus, in accordance with a preferred embodiment of the invention, feed flow encounters a relatively low resistance to flow when entering the module and passing through the feed entrance section (50). This area of low resistance allows feed to be redirected in a radial direction while preventing "dead" regions near the permeate collection tube (8) where feed velocity may otherwise slow. Moreover, the feed exit section (52) allows feed flow to maintain high and uniform velocity across the active membrane (25) near the module's periphery (38), where sealant concentration is highest. Because the module's outer periphery (38) (i.e. distal end (20) of membrane envelope (4)), is where permeate back pressure is the greatest, flux is reduced at this location. As a consequence, scaling is much less likely to occur, making the spiral wound membrane module capable of operating at higher recovery rates than conventional designs. Moreover, the subject module is amenable to large scale manufacturing and may utilize conventional infrastructure, pressure vessels, etc.

Materials for constructing various components of spiral wound modules are well known in the art. Suitable sealants for sealing membrane envelopes include urethanes, epoxies, silicones, acrylates, hot melt adhesives and UV curable adhesives. While less common, other sealing means may also be used such as application of heat, pressure, ultrasonic welding and tape. Permeate collection tubes are typically made from plastic materials such as acrylonitrile-butadiene-styrene, polyvinyl chloride, polysulfone, poly (phenylene oxide), polystyrene, polypropylene, polyethylene or the like. Tricot polyester materials are commonly used as permeate spacers. Additional permeate spacers are described in U.S. Pat. No. 8,388,848.

The membrane sheet is not particularly limited and a wide variety of materials may be used, e.g. cellulose acetate materials, polysulfone, polyether sulfone, polyamides, polysulfonamide, polyvinylidene fluoride, etc. A preferred membrane is a three layer composite comprising 1) a backing layer (back side) of a nonwoven backing web (e.g. a non-woven fabric such as polyester fiber fabric available from Awa Paper Company), 2) a middle layer comprising a porous support having a typical thickness of about 25-125 µm and 3) a top discriminating layer (front side) comprising a thin film polyamide layer having a thickness typically less than about 1 micron, e.g. from 0.01 micron to 1 micron but more commonly from about 0.01 to 0.1 µm. The backing layer is not particularly limited but preferably comprises a non-woven fabric or fibrous web mat including fibers which may be orientated. Alternatively, a woven fabric such as sail cloth may be used. Representative examples are described in U.S. Pat. Nos. 4,214,994; 4,795,559; 5,435,957; 5,919,026; 6,156,680; US to 2008/0295951 and U.S. Pat. No. 7,048,855. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 µm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. The discriminating layer is preferably formed by an interfacial polycondensation reaction between a polyfunctional amine monomer and a polyfunctional acyl halide monomer upon the surface of the microporous polymer layer. Due to its relative thinness, the polyamide layer is often described in terms of its coating coverage or loading upon the porous support, e.g. from about 2 to 5000 mg of polyamide per square meter surface area of porous support and more preferably from about 50 to 500 mg/m$^2$.

The proto-typical membranes for reverse osmosis are FilmTec Corporation's FT-30™ type membranes, made by reaction of m-phenylene diamine and trimesoyl chloride. This and other interfacial polycondensation reactions are described in several sources (e.g. U.S. Pat. Nos. 4,277,344 and 6,878,278). The polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O)NH—) occur along the molecular chain. The polyfunctional amine and polyfunctional acyl halide monomers are most commonly applied to the porous support by way of a coating step from solution, wherein the polyfunctional amine monomer is typically coated from an aqueous-based or polar solution and the polyfunctional acyl halide from an organic-based or non-polar solution.

The pressure vessels used in the present invention are not particularly limited but preferably include a solid structure capable of withstanding pressures associated with operating conditions. The vessel structure preferably includes a chamber having an inner periphery corresponding to that of the outer periphery of the spiral wound modules to be housed therein. The pressure vessel may also include one or more caps or end plates that seal the chamber once loaded with one or more modules. The vessel further includes a feed inlet located at one of end of the chamber, a concentrate outlet preferably located at the opposite end of the chamber, and at least one permeate outlet. The orientation of the pressure vessel is not particularly limited, e.g. both horizontal and vertical orientations may be used.

Examples of applicable pressure vessels, module arrangements and loading are described in: U.S. Pat. Nos. 6,074,595, 6,165,303, 6,299,772 and US 2008/0308504. Manufacturers of pressure vessels for large systems include Pentair of Minneapolis Minn., Bekaert of Vista Calif. and Bel Composite of Beer Sheva, Israel. The length of the chamber preferably corresponds to the combined length of the modules to be sequentially (axially) loaded, e.g. 1 to 8 modules, see US 2007/0272628 to Mickols. The module of this invention is particularly useful as the last module in a series of modules, so that it sees the highest feed water concentrations. In a preferred situation, water to be treated is supplied from upstream modules and enters the feed inlet section (50). Less than 50% of water to be treated is converted to permeate. The majority water to be treated flows perpendicular to the permeate tube through the central feed section (54) and the feed exit section (52). Concentrated feed water leaving the module near the outer periphery (38) exits the vessel. A preferred embodiment comprises other modules within the vessel and the majority of other modules have a conventional design, wherein feed flow is predominantly oriented parallel to the permeate tube.

This invention is particular suitable to modules designed for residential use, e.g. those have less than 2 m$^2$ and more preferably less 1 m$^2$ of membrane area. A preferred length for such a module is less than 0.5 m. A representative hyperfiltration module includes FilmTec's 1812 configuration (e.g. TW30-1812), which is nominally 1.8 inches (4.6 cm) in diameter and nominally 12 inches (30 cm) long. This module can be equipped with the feed spacer sheet as described herein. Preferably, this inventive module would be the only module within a vessel. The vessel containing an inventive module would include only one each of connections for feed, concentrate, and permeate streams.

Many embodiments of the invention have been described and in some instances certain embodiments, selections, ranges, constituents, or other features have been characterized as being "preferred". Such designations of "preferred" features should in no way be interpreted as an essential or critical aspect of the invention. Expressed ranges specifically include end points.

The invention claimed is:

1. A spiral wound membrane module (2) comprising at least one membrane envelope (4) and at least one feed spacer sheet (6) wound about a central permeate collection tube (8) to form inlet (30) and outlet (32) scroll faces and an outer periphery (38), wherein the feed spacer sheet (6) comprises:
   i) an inner section (50) extending along the permeate collection tube (8) from the inlet scroll face (30) toward the outlet scroll face (32),
   ii) an outer section (52) extending along the outer periphery (38) from the outlet scroll face (32) toward the inlet scroll face (30), and
   iii) a central section (54) located between the inner section (50) and the outer section (52);
      wherein the inner section (50) of the feed spacer sheet (6) encompasses an area that is less than 20% of the total area of the feed spacer sheet (6); and
      wherein the inner section (50) of the feed spacer sheet (6) has a median resistance to flow in a direction parallel to the permeate collection tube (8) that is less than 25% of a median resistance to flow of the central section (54) in a direction perpendicular to the permeate collection tube (8) the resistance to flow of the feed spacer sheet is the pressure drop per unit distance measured at a water velocity of 15 cm/second at 25° C.

2. The spiral wound module (2) of claim 1, wherein both the inner section (50) and central section (54) comprise a first spacer sheet type, and the inner section (50) of the feed spacer sheet (6) further comprises an overlapping second spacer sheet type; wherein the second spacer sheet type has less median resistance to flow in a direction parallel to the permeate collection tube (8) than the first spacer sheet type.

3. The spiral wound module (2) of claim 1, wherein the feed spacer sheet (6) is a net, both the inner section (50) and central section (54) comprise a first spacer sheet type, and either bosses or apertures provided within the net in the inner section (50) of the feed spacer sheet (6) provide flow channels that reduce resistance to feed flow in the direction parallel to the permeate collection tube (8).

4. The spiral wound module (2) of claim 1 further comprising a feed entrance region (60) located on the inlet scroll face (30) adjacent to the permeate collection tube (8), a feed exit region (64) located on the outlet scroll face (32) adjacent to the outer periphery (38) and a feed flow pathway (48) extending from the feed entrance region (60) to the feed exit region (64).

5. The spiral wound module (2) of claim 4 further comprising an exit cap member (35) that restricts flow through the outlet scroll face (32) to a region near the outer periphery (38) such that at least 75% of feed liquid passing through the central section (54) also passes through the feed exit region (64).

6. The spiral wound module (2) of claim 1 wherein the outer section (52) of the feed spacer sheet (6) has a median resistance to flow in a direction parallel to the permeate collection tube (8) that is less than 25% of the median resistance to flow of the central section (54) in a direction perpendicular to the permeate collection tube.

7. The spiral wound module (2) of claim 1 wherein:
the membrane envelope (4) comprises a membrane sheet (10) comprising an active membrane region (25) through which liquid may flow and a non-active membrane region (25') from which liquid flow is blocked,
the outer section (52) of the feed spacer sheet (6) is in planar contact with the membrane sheet (10), and
wherein the majority of planar contact between the outer section (52) and the membrane sheet (10) is in the non-active membrane region (25').

8. The spiral wound module (2) of claim 2 wherein the second spacer sheet type is a net oriented to have less resistance to flow in the direction parallel to the permeate collection tube (8) than in the direction perpendicular to the permeate collection tube (8).

9. The spiral wound module (2) of claim 1 further comprising an impermeable layer (69) wrapped about the outer periphery (38), and a brine seal (65) is located about the impermeable layer (69).

\* \* \* \* \*